(12) United States Patent
Kawai et al.

(10) Patent No.: US 12,543,754 B2
(45) Date of Patent: Feb. 10, 2026

(54) MULTI-LAYER FERMENTED MILK PRODUCT IN CONTAINER, PRODUCTION METHOD THEREOF, AND SAUCE FOR FERMENTED MILK PRODUCT

(71) Applicant: MEIJI CO., LTD., Tokyo (JP)

(72) Inventors: Yoshitaka Kawai, Tokyo (JP); Ippei Ogawa, Tokyo (JP); Tomomi Abe, Tokyo (JP); Nobuyuki Shimizu, Tokyo (JP)

(73) Assignee: MEIJI CO., LTD., Tokyo (JP)

( * ) Notice: Subject to any disclaimer, the term of this patent is extended or adjusted under 35 U.S.C. 154(b) by 895 days.

(21) Appl. No.: 17/277,347

(22) PCT Filed: Sep. 26, 2019

(86) PCT No.: PCT/JP2019/037783
§ 371 (c)(1),
(2) Date: Mar. 18, 2021

(87) PCT Pub. No.: WO2020/067251
PCT Pub. Date: Apr. 2, 2020

(65) Prior Publication Data
US 2021/0345631 A1    Nov. 11, 2021

(30) Foreign Application Priority Data

Sep. 27, 2018 (JP) .................. 2018-181400
Sep. 27, 2018 (JP) .................. 2018-183009
Apr. 1, 2019 (JP) .................. 2019-070259

(51) Int. Cl.
   *A23C 9/13*     (2006.01)
(52) U.S. Cl.
   CPC .................. *A23C 9/1307* (2013.01)
(58) Field of Classification Search
   CPC .................................. A23C 9/1307
See application file for complete search history.

(56) References Cited

U.S. PATENT DOCUMENTS

2009/0202682 A1 * 8/2009 Moreau .............. A23G 3/28
                                                   426/103

FOREIGN PATENT DOCUMENTS

JP     50-76249     6/1975
JP     59-2661     1/1984
(Continued)

OTHER PUBLICATIONS

JP 2002112703 A English Translation. (Year: 2002).*
(Continued)

*Primary Examiner* — Stephanie A Kohler
(74) *Attorney, Agent, or Firm* — Wenderoth, Lind & Ponack, L.L.P.

(57) ABSTRACT

Disclosed is a method for producing a rich fermented milk having the original hardness and dense texture of the fermented milk. Disclosed is a method for producing a multi-layer fermented milk of a post-fermentation type, including the steps of: filling a container with a raw material milk to which a starter has been added and a sugar-containing liquid so as not to mix the raw material milk and the sugar-containing liquid, wherein the sugar-containing liquid has an amount of 15.0% by mass or more of the total amount of the raw material milk and the sugar-containing liquid, and the sugar-containing liquid has a solid content of 20.0% by mass or more; and fermenting the raw material milk in the filled container to obtain a multi-layer fermented milk product in a container in which a fermented milk layer having a higher solid content than the raw material milk is formed and a storage modulus G', which is an index of hardness of the fermented milk, is 1200 Pa or more. The produced fermented milk has a fermented milk layer having a solid content of 20.0% by mass or more and a sugar-containing liquid layer adjacent to and below the fermented milk layer.

11 Claims, 2 Drawing Sheets

(56) References Cited

FOREIGN PATENT DOCUMENTS

| JP | 2001-269113 | 10/2001 |
| JP | 2002-112703 | 4/2002 |
| JP | 2008-104436 | 5/2008 |
| JP | 2013-13339 | 1/2013 |
| JP | 2013-192534 | 9/2013 |

OTHER PUBLICATIONS

JP 2013192534 A English Translation. (Year: 2013).*
International Search Report (ISR) issued Dec. 10, 2019 in International (PCT) Application No. PCT/JP2019/037783.
R.V. Salamon, et al., "Preliminary observations on the effects of milk fortification with conjugated linoleic acid in yogurt preparation", Journal of Physics, Conference Series 602, 2015, 012017 [Online], [retrieved on Oct. 10, 2019], Retrieved from the Internet: <URL:https://iopscience.iop.org/article/10.1088/1742-6596/602/1/012017/pdf>, p. 2 fig. 1.
Mar. 25, 1998, Isbn 4-254-43040-X, p. 167, 10.4.a col. non-official translation (UENOGAWA, Shuichi, "Series <Food chemistry> Milk chemistry", 3rd printing, TOKYO : Asakura Publishing Co., Ltd.), cited in ISR.
Office Action issued May 22, 2024 in Chinese Patent Application No. 201980062570.4, with English-language translation.
Office Action issued Feb. 6, 2024 in Japanese Patent Application No. 2019-070259, with English-language translation.

* cited by examiner

MULTI-LAYER FERMENTED MILK PRODUCT IN CONTAINER, PRODUCTION METHOD THEREOF, AND SAUCE FOR FERMENTED MILK PRODUCT

TECHNICAL FIELD

The present invention relates to a multi-layer fermented milk product in a container, a production method thereof, and a sauce for a fermented milk product, and more particularly, to a multi-layer rich fermented milk, a production method thereof, and a sauce.

BACKGROUND ART

Fermented milk is roughly classified into a pre-fermentation type in which raw material milk (also referred to as yogurt base or yogurt mix) is fermented in a tank and formed curds are broken and filled in a container, and a post-fermentation type in which raw material milk is filled in a container and fermented in the container. In general, rich yogurt characterized by a rich taste is mainly produced industrially as a pre-fermentation type which is produced by breaking curds and then removing water by separator or membrane concentration to concentrate the curds. On the other hand, in the main field of yogurt, Bulgaria, there is a traditional method for producing yogurt of a post-fermentation type in which milk is fermented in a biscuit pot. In this method, the biscuit pot absorbs water from the milk during fermentation, and the water evaporates from the surface of the pot, thereby concentrating the milk. In addition, since heat of vaporization is lost when water evaporates, low-temperature fermentation occurs. The yogurt obtained by this method is smooth and has a rich texture.

On the other hand, two-layer yogurt in a container composed of yogurt and sauce has been developed. As a method for producing a post-fermentation type two-layer yogurt having a sauce as an upper layer and a yogurt as a lower layer, Patent Literature 1 proposes a production method characterized by filling a container with a yogurt mix containing milk as a main component, filling the upper surface of the yogurt mix with a sauce having a specific gravity smaller than that of the yogurt mix, and performing fermentation.

Also in Patent Literature 2, a fermented milk product in a container, containing fermented milk as an upper layer and a sauce such as fruit sauce as a lower layer is produced by a method (post-fermentation) in which a fermented milk mix (a raw material of fermented milk including raw material milk) is accommodated in a container, a sauce having a specific gravity larger than that of the fermented milk mix is accommodated on the fermented milk mix, the sauce is sunk below the fermented milk mix using a difference in specific gravity between the fermented milk mix and the sauce, and then the fermented milk mix in the container is fermented (for example, see Patent Literature 2).

CITATION LIST

Patent Literature

[Patent Literature 1] JP-A-2001-269113 (JP-B-4012663)
[Patent Literature 2] JP-A-2013-13339

SUMMARY OF INVENTION

Technical Problem

In the case of producing a rich fermented milk, when the pre-fermentation type is used, a fermented milk having a high solid content can be realized by mechanically removing water in the production step, but the structure of the fermented milk is broken in the step of breaking the curds, and the original hardness, dense texture upon eating, and the like of the fermented milk are impaired. On the other hand, the above-mentioned Patent Literature 1 relating to the post-fermentation type does not describe the rich fermented milk, and rather, in this production method, since fermentation is performed by filling a sauce having a specific gravity smaller than that of the yogurt mix, transfer of water from the sauce to the yogurt mix occurs, which is considered to be unsuitable as a method for producing the rich fermented milk having a high solid content.

From the viewpoint of obtaining the fermented milk having a high solid content, removal of water from raw material milk or fermented milk should be focused on. However, it has been found that when water is reduced from raw material milk and the sugar concentration of raw material milk is increased, there is a problem in that the induction period of lactic acid bacteria in initial fermentation (a period in which bacteria adapt to culture conditions and are prepared for active proliferation; proliferation of lactic acid bacteria is relatively slow) does not proceed well and fermentation is delayed.

In such a multi-layer fermented milk product in a container of a post-fermentation type, if the fermentation is delayed and the original hardness of the fermented milk is impaired, when the container is laid sideways during transportation or the like, there is a possibility that a fermented milk layer may be disintegrated in the container, and thus there is also a problem that the product quality is remarkably deteriorated.

In addition, in the case of a multi-layer fermented milk product in a container of a post-fermentation type, when a sauce layer is provided on the lower side of the fermented milk layer, it is desirable that the layer state of the fermented milk layer and the sauce layer at the time of production is maintained as it is even at the store.

Solution to Problem

The present inventors have conducted intensive studies on a method for producing a post-fermentation type rich fermented milk. As a result, the present inventors have found a multi-layer fermented milk product in a container, which is obtained by filling a sugar-containing liquid, jam, or the like having high sugar content into a container before fermentation so as not to be mixed with raw material milk and fermenting the raw material milk, and which can obtain a fermented milk having a rich texture in spite of being a post-fermentation type. It has also been found that the fermented milk in a container itself obtained by the production method of the present invention has characteristics different from those of conventional fermented milk in a container.

The present invention provides the following [1] to [9].

[1] A multi-layer fermented milk product in a container, containing: a fermented milk layer of a post-fermentation type; and a sugar-containing liquid layer adjacent to and below the fermented milk layer in the container, wherein a storage modulus G', which is an index of hardness of the fermented milk, is 1200 Pa or more.

[2] The multi-layer fermented milk product in the container according to [1], wherein the fermented milk layer has a solid content of 20.0% by mass or more.

[3] The multi-layer fermented milk product in the container according to [1] or [2], wherein a disintegration time until the fermented milk layer is disintegrated by a laying sideways test is 2 hours or more.

[4] A method for producing a multi-layer fermented milk product in a container, including the steps of:

filling the container with a raw material milk to which a starter has been added and a sugar-containing liquid so as not to mix the raw material milk and the sugar-containing liquid, wherein the sugar-containing liquid has an amount of 15.0% by mass or more of the total amount of the raw material milk and the sugar-containing liquid, and the sugar-containing liquid has a solid content of 20.0% by mass or more; and fermenting the raw material milk in the filled container to obtain the multi-layer fermented milk product in the container in which a fermented milk layer having a higher solid content than the raw material milk is formed and a storage modulus G', which is an index of hardness of the fermented milk, is 1200 Pa or more.

[5] The production method according to [4], wherein the solid content of the sugar-containing liquid to be filled is higher than a solid content of the raw material milk by 2.0 to 40.0% by mass.

[6] The production method according to [4] or [5], wherein the amount of the sugar-containing liquid to be filled is 20.0 to 40.0% by mass of the total amount of the raw material milk and the sugar-containing liquid.

[7] The production method according to any one of [4] to [6], wherein the solid content of the raw material milk is less than 20.0% by mass.

[8] The production method according to any one of [4] to [7], wherein the solid content of the fermented milk layer is 1.10 times or more that of the raw material milk.

[9] The production method according to any one of [4] to [8], wherein the solid content of the fermented milk layer is 20.0% by mass or more.

The present invention also provides a sauce for a fermented milk product forming a sauce layer on a lower side of a fermented milk layer of the fermented milk product, which contains 0.25% by weight or more of modified starch and 0.15% by weight or more of pectin.

Advantageous Effects of Invention

According to the production method of the present invention, it is possible to obtain a multi-layer rich fermented milk product in which the structure of fermented milk is maintained.

Further, according to the present invention, even when the product is laid sideways, the fermented milk layer in the container is less likely to disintegrate as compared with the conventional case, and the product quality at the time of production can be maintained as it is.

Further, according to the sauce of the present invention, the state at the time of production in which the sauce is disposed on the lower side of the fermented milk layer can be maintained as compared with the conventional case.

DESCRIPTION OF EMBODIMENTS

1. First Embodiment

The present invention provides a method for producing a multi-layer fermented milk in a container, including the following steps.

(1) a step of filling the container with a raw material milk and an effective amount of a sugar-containing liquid having a relatively high solid content so as not to mix the raw material milk and the sugar-containing liquid; and (2) a step of fermenting the raw material milk in the filled container to obtain a multi-layer fermented milk product in a container, the product having a fermented milk layer having a higher solid content than the raw material milk and a sugar-containing liquid layer.

<Filling Step>

The production method of the present invention includes a step of filling a container with a raw material milk and an effective amount of a sugar-containing liquid having a relatively high solid content so as not to mix the raw material milk and the sugar-containing liquid.

[Raw Material Milk]

The raw material milk (also referred to as "yoghurt base" or "yoghurt mix") used in the present invention is prepared by mixing any one selected from the group consisting of raw milk, cream, condensed skimmed milk, milk protein concentrate, cow milk, special cow milk, raw goat milk, sterilized goat milk, raw sheep milk, homogenized milk, low-fat milk, fat-free milk, and processed milk, and if necessary, water, sugar, sweetener, and stabilizer.

The concentration of the milk fat in the raw material milk is, for example, 8.0% by mass or less, preferably 0.01% by mass to 8.0% by mass, more preferably 0.01% by mass to 7.0% by mass, and still more preferably 0.01% by mass to 6.0% by mass, with respect to the entire raw material milk. This is because when the concentration of the milk fat with respect to the entire raw material milk is within the above range, the flavor of the obtained fermented milk becomes suitable.

The concentration of a solid-non-fat (SNF) of the raw material milk is, for example, 20.0% by mass or less, preferably 1.0% by mass to 20.0% by mass, more preferably 3.0% by mass to 19.0% by mass, and still more preferably 5.0% by mass to 18.0% by mass, with respect to the entire raw material milk. This is because when the concentration of the solid-non-fat (SNF) with respect to the entire raw material milk is within the above range, the flavor of the obtained fermented milk becomes favorable. The solid-non-fat (SNF) means a component obtained by removing milk fat from a milk component. The concentration of the protein in the raw material milk is, for example, 12.0% by mass or less, preferably 1.0% by mass to 11.0% by mass, more preferably 1.5% by mass to 10.0% by mass, and still more preferably 2.0% by mass to 9.0% by mass, with respect to the entire raw material milk.

The raw material milk may be subjected to a homogenization step using a homomixer, a homogenizer, or the like. By the homogenization, fat globules are atomized, and separation and floating of milk fat contained in raw milk and cream are suppressed. When raw milk or cream is not blended, the homogenization step may be omitted.

The raw material milk may be subjected to a sterilization step using an indirect heating device, a direct heating device, an electric heating device, or the like. As a method and equipment for sterilizing the raw material milk, methods and equipment usually used in the food field may be used. Examples of methods for sterilizing the raw material milk include low-temperature long-time pasteurization (LILT, 60 to 70° C., to 40 minutes, etc.), high-temperature long-time pasteurization (HILT, 80 to 90° C., 5 to 20 minutes, etc.), high-temperature short-time pasteurization (HIST, 100 to 110° C., 1 to 3 minutes, etc.), and ultrahigh-temperature pasteurization (UHT, 120 to 150° C., 1 to 10 seconds, etc.). Before the raw material milk is sterilized, the pH of the raw material milk may be adjusted as necessary. After the raw material milk is sterilized, the raw material milk may be cooled to a temperature close to the fermentation temperature, and then a starter for fermentation may be added.

In the production method of the present invention, it is important that the solid content of the sugar-containing liquid filled in a container is relatively higher than the solid content of the raw material milk as described later. With respect to the raw material milk, the term "solid content" refers to the solid content of the raw material milk before fermentation when filled in a container, unless otherwise specified.

In the present invention, with respect to the raw material milk or the fermented milk, the term "solid content" refers to the proportion (% by mass) of solid components contained in the liquid portion of the raw material milk or the fermented milk. The solid content of the raw material milk can be determined by calculation. Even if the fermented milk contains solids, the solids content refers to the liquid portion.

The solid content can be measured by a conventional method used in this field, that is, the solid content can be determined based on the remaining amount after drying at a certain temperature for a certain time (that is, solid content (% by mass) of sample=mass after drying of sample÷mass of sample×100).

The solid content of the raw material milk is, for example, 15.0% by mass or more, more preferably 16.0% by mass or more, and still more preferably 17.0% by mass or more. Within such a range, it is easy to prepare a sugar-containing liquid having a higher solid content, and a sufficient rich texture can be obtained in the obtained fermented milk. The upper limit of the solid content of the raw material milk may be less than 21.4% by mass, less than 21.0% by mass, or less than 20.0% by mass, regardless of the lower limit.

[Lactic Acid Bacteria and the Like]

A starter (which contains a population of microorganisms serving as a main body of fermentation and is added to start fermentation) is added to the raw material milk filled in the filling step. The microorganism contained in the starter is not particularly limited as long as it can produce fermented milk, and examples thereof include lactic acid bacteria, bifidobacteria, and yeast. Examples of lactic acid bacteria include *Lactobacillus bulgaricus, Streptococcus thermophilus, Lactococcus lactis, Streptococcus cremoris, Lactobacillus casei*, and *Bifidobacterium*, which have been used in production of fermented milk, and a combination (mixture) of *Lactobacillus bulgaricus* and *Streptococcus thermophilus*, which have been used in production of yogurt, is preferable. Hereinafter, the fermentation of the raw material milk will be specifically described by taking lactic acid bacteria as an example, but in the present invention, microorganisms that can be used for the fermentation of the raw material milk are not limited to lactic acid bacteria.

[Sugar-Containing Liquid]

In the filling step, a sugar-containing liquid (hereinafter also referred to as a sauce) is filled into a container in addition to the raw material milk. The sugar-containing liquid refers to a solution in which a saccharide that can be assimilated by the lactic acid bacterium used (also referred to as sugar) is dissolved, and which forms a layer different from the fermented milk layer in the obtained fermented milk in the container. The saccharides include monosaccharides, disaccharides, and oligosaccharides.

The saccharide contained in the sugar-containing liquid is not particularly limited as long as it can be assimilated by lactic acid bacteria and is suitable for being eaten together with fermented milk. Examples of the saccharide having sweetness include sucrose, glucose, fructose, maltose, isomerized sugar, syrup, highly saccharified reduced syrup, low saccharified reduced syrup, palatinose, fructooligosaccharide, lactose, galactooligosaccharide, lactooligosaccharide, soybean oligosaccharide, raffinose, honey, maple syrup, fruit juice, concentrated fruit juice, sorbitol, maltitol, palatinit, erythritol and trehalose.

The sugar-containing liquid may contain components other than saccharides. Examples of components other than saccharides include sweeteners other than saccharides, coloring agents, preservatives, thickening stabilizers, antioxidants, acidulants, and flavoring agents. The sugar-containing liquid may also be mixed with a solid. Examples of solids include fruits and vegetables (strawberries, blueberries, raspberries, blackberries, white peaches, yellow peaches, plums, prunes, figs, mangoes, mandarine oranges, lemons, kiwifruit, pomegranate, apples, Japanese pears, pears, pineapples, bananas, aloe, etc.), processed fruits and vegetables (jams, purees, etc.), nata de coco, mousses, chocolates, jellies, gummies, marshmallows, candies, gums, agars, konjac, and cereals.

In the production method of the present invention, the solid content of the sugar-containing liquid (the solid content of the sugar-containing liquid is particularly also referred to as the sugar content) is higher than the solid content of the raw material milk filled in the container. The term "solid content" with respect to the sugar-containing liquid refers to a solid content dissolved in the sugar-containing liquid (liquid), and the above-mentioned solid is not considered, unless otherwise specified. In addition, the solid content (sugar content) of the sugar-containing liquid refers to the solid content (sugar content) of the sugar-containing liquid before fermentation when the sugar-containing liquid is filled in a container, unless otherwise specified. The sugar content of the sugar-containing liquid refers to a measurement value measured by a digital sugar content meter (for example, IPR-201α manufactured by AS ONE Corporation) unless otherwise specified. The sugar content may be expressed by "°", and in the description related to the present invention, "°" may be read as "% by mass".

In the production method of the present invention, since the solid content of the sugar-containing liquid to be filled is higher than that of the fermented milk, the fermented milk having a solid content higher than that of the raw material milk can be formed in a fermentation step described later. The solid content of the sugar-containing liquid to be filled depends on the amount of the sugar-containing liquid, but is not particularly limited as long as fermented milk having a solid content higher than that of the raw material milk can be formed. From the viewpoint of forming fermented milk having a solid content higher than that of the raw material milk, the solid content of the sugar-containing liquid to be filled is preferably 2% by mass or more higher than the solid content of the raw material milk to be filled. In particular, the solid content of the sugar-containing liquid to be filled can be, for example, 7.0% by mass or more higher than the solid content of the raw material milk to be filled, preferably 10.0% by mass or more higher, more preferably 11.0% by mass or more higher, and still more preferably 12.0% by mass or more higher.

In any case of the lower limit of the solid content of the sugar-containing liquid to be filled, the upper limit of the solid content of the sugar-containing liquid to be filled is preferably the solid content of the raw material milk to be filled+40% by mass or less. In particular, the upper limit of the solid content of the sugar-containing liquid to be filled is the solid content of the raw material milk to be filled+33.0% by mass or less, preferably the solid content of the fermented milk+30.0% by mass or less, more preferably the solid content of the fermented milk+25.0% by mass or less, and still more preferably the solid content of the fermented milk+20.0% by mass or less. This is because it is considered that within such a range, the induction period of lactic acid bacteria in the initial fermentation is not inhibited and fermentation proceeds sufficiently without delay.

When the solid content of the raw material milk is 18.0% by mass or less, the solid content of the sugar-containing liquid may be, for example, 20.0% by mass or more, preferably 22.0% by mass or more, more preferably 25.0% by mass or more, and still more preferably 28.0% by mass or more, depending on the amount of the sugar-containing liquid. The upper limit of the solid content of the sugar-containing liquid when the solid content of the raw material milk is 18.0% by mass or less is 50.0% by mass or less, preferably 45.0% by mass or less, more preferably 41.0% by mass or less, and still more preferably 38.0% by mass or less, regardless of the lower limit.

In the production method of the present invention, an effective amount of the sugar-containing liquid is filled in a container. The effective amount refers to an amount sufficient to achieve a rich fermented milk having a higher solid content than the raw material milk in the fermentation step described below, and those skilled in the art can appropriately design the amount in consideration of the solid content of the sugar-containing liquid, the solid content of the raw material milk, the intended rich texture in the obtained fermented milk, and the like.

Specifically, when the solid content of the sugar-containing liquid is the solid content of the raw material milk+2.0 to 40.0% by mass, the effective amount of the sugar-containing liquid can be 10.0% by mass or more, preferably 13.0% by mass or more, more preferably 15.0% by mass or more, and still more preferably 20.0% by mass or more of the total mass of the raw material milk and the sugar-containing liquid. The upper limit of the effective amount of the sugar-containing liquid when the solid content of the sugar-containing liquid is the solid content of the raw material milk+2.0 to 40.0% by mass is 45.0% by mass or less, preferably 42.5% by mass or less, more preferably 40.0% by mass or less, and still more preferably 35.0% by mass or less, of the total mass of the raw material milk and the sugar-containing liquid, regardless of the lower limit. This is because it is considered that within such a range, fermented milk having a higher solid content than the raw material milk can be formed in the fermentation step, and the intended rich texture can be achieved, while growth of lactic acid bacteria in the initial stage of the fermentation step is not inhibited, and fermentation proceeds without delay. The filling amount of the sugar-containing liquid may be determined from the viewpoint that the sugar-containing liquid is suitable for being eaten together with the fermented milk as long as it is within the range of the effective amount.

The sugar-containing liquid can be prepared by a conventional method. For example, it can be prepared by mixing and dissolving a raw material such as a saccharide in water, followed by heat sterilization and deaeration as necessary.

[Filling]

In the production method of the present invention, the raw material milk and the sugar-containing liquid are filled in a container so as not to be mixed. In order to prevent the raw material milk and the sugar-containing liquid from being mixed with each other, the sugar-containing liquid having a higher solid content than the raw material milk may be filled in the lower layer and the raw material milk may be filled in the upper layer. By using a sugar-containing liquid having a higher solid content and a higher specific gravity as the lower layer, turbidity of the sugar-containing liquid and the raw material milk can be suppressed even during fermentation. In addition, by not mixing, the raw material milk can be concentrated during fermentation, as in the traditional process for producing yogurt of a post-fermentation type. Further, by not mixing, the inhibition of the growth of lactic acid bacteria in the initial fermentation by a high sugar concentration can be suppressed during fermentation, and the fermentation can proceed appropriately.

The material of the container to be filled may be any material that is acceptable as a food container and can withstand the fermentation step, storage, and distribution, and examples thereof include paper and plastic. The size of the container is not particularly limited as long as fermentation can be uniformly performed. Concretely, the content can be 50 to 1000 g, preferably 70 to 800 g, more preferably 70 to 500 g, and still more preferably 90 to 450 g. The size of the container may be determined in consideration of the intake amount of the fermented milk per one time.

After the raw material milk to which the starter is added and an effective amount of the sugar-containing liquid having a solid content higher than that of the raw material milk are filled in the container so as not to be mixed, the opening of the container can be sealed with a lid member.

<Fermentation Step>

[Fermentation Conditions]

The conditions for fermenting the raw material milk in the filled container are not particularly limited as long as the effects of the present invention are obtained, but it is preferable to appropriately adjust the fermentation temperature and/or the fermentation time. At this time, in the present invention, the fermentation temperature depends on the type of lactic acid bacteria actually used, the optimal temperature of activity of the lactic acid bacteria, and the like, and is exemplified by 30 to 50° C., preferably 35 to 48° C., and more preferably 38 to 45° C. Specifically, for example, in a combination (mixture) of *Lactobacillus bulgaricus* and *Streptococcus thermophilus*, the fermentation temperature is exemplified by 30 to 45° C., preferably 32 to 44° C., more preferably 34 to 44° C., still more preferably 36 to 43° C., and particularly preferably 38 to 43° C. When the fermentation temperature is within the above range, fermented milk having good flavor can be obtained in an appropriate fermentation time.

The fermentation time depends on the type of lactic acid bacteria actually used, the amount of lactic acid bacteria added, the fermentation temperature, and the like. Specifically, for example, when a combination (mixture) of *Lactobacillus bulgaricus* and *Streptococcus thermophilus* is used, the fermentation time is exemplified by 1 to 20 hours, preferably 1.5 to 15 hours, more preferably 2 to 12 hours, and still more preferably 2.5 to 10 hours. When the fermentation time is within the above range, fermented milk having good production suitability and good flavor can be obtained.

The fermentation step can be carried out until the pH is at a suitable value. The pH at the end of fermentation is exemplified by 3.0 to 5.2, preferably 3.2 to 4.9, more preferably 3.4 to 4.8, still more preferably 3.6 to 4.5, and particularly preferably 3.8 to 4.3. This is because when the pH of the raw material milk at the end of fermentation is within the above range, fermented milk having good flavor can be obtained. The pH of the raw material milk at the end of fermentation is measured with, for example, a pH meter. In the context of the present invention, when the value of pH is shown, it is the value at 10° C. unless otherwise specified.

By passing through the fermentation step under predetermined conditions, a rich multi-layer fermented milk which is contained in a container and is of a post-fermentation type can be produced. In the produced fermented milk in a container, the solid content of the fermented milk layer is higher than that of the raw material milk. Specifically, the solid content of the fermented milk layer is 1.10 times, preferably 1.15 times, more preferably 1.20 times, and still more preferably 1.25 times that of the raw material milk.

The solid content of the fermented milk layer in the produced fermented milk in a container may also be 20.0% by mass or more, preferably 21.0% by mass or more. Furthermore, the solid content of the fermented milk layer is preferably 21.8% by mass or more, more preferably 22.1% by mass or more, and still more preferably 22.4% by mass or more.

Since the fermented milk layer is a post-fermentation type, the structure (network structure) formed by fermentation is maintained, and the layer has a certain hardness. In addition, the maintained structure contributes to the rich texture in the case of eating.

The produced fermented milk in a container has multiple layers. The term "multi-layer" refers to having at least two layers of a sugar-containing liquid layer and a fermented milk layer. The layer other than the sugar-containing liquid layer and the fermented milk layer can be formed by, for example, further laminating a layer of fruit sauce or the like on the upper surface of the fermented milk layer after fermentation.

<Multi-Layer Fermented Milk of Post-Fermentation>

The fermented milk produced by the production method of the present invention has the following characteristics that:
  the structure has a fermented milk layer of a post-fermentation type and a sugar-containing liquid layer adjacent to and below the fermented milk layer;
  fermented milk is a post-fermentation type in a container; and
  the fermented milk layer has a rich texture (rich fermented milk).

Conventionally, a two-layer yogurt in a container of a post-fermentation type has been known (Patent Literature 1 listed above), but has a form in which sauce is filled on the upper surface of fermented milk. Moreover, it was not recognized as a rich fermented milk.

In the present invention and embodiments thereof, the expression "rich" with respect to fermented milk refers to the case where the storage modulus G' of the fermented milk layer at the time of eating (any day from 0 to several days after production, typically after 8 days from production) is 1200 Pa or more, unless otherwise specified. In addition, it is desirable that at least one, preferably all, of the following items be satisfied.

The solid content of the fermented milk layer is 20.0% by mass or more.

It should be evaluated as rich (5 points) or slightly rich (4 points) by sensory evaluation (5 grades of 1 point to 5 points) by experts.

At the time of eating, it may be immediately after production, 1 day after production, or 2 to 30 days after production. Storage after production is preferably carried out at 10° C. or lower.

The solid content of the fermented milk layer in the post-fermentation type fermented milk in a container of the present invention is 20.0% by mass or more, preferably 21.0% by mass or more, more preferably 21.8% by mass or more, still more preferably 22.1% by mass or more, and most preferably 22.4% by mass or more.

[Storage Modulus G']

The storage modulus G' represents the hardness of the fermented milk (the degree to which the structure is maintained), and when this value is high, it represents that the fermented milk is harder (the network structure formed by fermentation is less likely to collapse). According to the study by the present inventors, the storage modulus G' is also a value correlated with "rich texture" described later. When the storage modulus G' of a fermented milk layer in a multi-layer fermented milk product is measured, it is preferable to measure the storage modulus G' of a portion representative of the portion farthest from a sugar-containing liquid layer. For example, when the lower layer is a sugar-containing liquid layer and the lower layer is a fermented milk layer, the measurement may be performed on the central portion of the upper surface of the fermented milk layer.

The storage modulus G' of the fermented milk can be measured using a commercially available rheometer. Concretely, a viscoelasticity measuring apparatus Physica MCR301 manufactured by Anton Paar can be used. The storage modulus G' as shown herein is a numerical value measured using this apparatus under the measurement conditions of a temperature of 18° C., a frequency of 1 Hz, and a strain of $\gamma=1.0$.

The storage modulus G' of the fermented milk layer in the post-fermentation type fermented milk in a container of the present invention is a value measured after 8 days from the production date (after 8 days from production) when the raw material milk in the container is fermented in the fermentation step and the fermented milk having a higher solid content than the raw material milk is produced, and is preferably 1200 Pa or more. Among them, the storage modulus G' of the fermented milk layer is particularly 1300 Pa or more, preferably 1400 Pa or more, more preferably 1500 Pa or more, still more preferably 1600 Pa or more, even more preferably 2000 Pa or more, and most preferably 2100 Pa or more.

The upper limit of the storage modulus G' of the fermented milk layer after 8 days from production is desirably 5000 Pa or less in order to prevent the fermented milk from becoming too hard and to realize a smooth texture by post-fermentation. The storage modulus G' of the fermented milk layer is more preferably 2500 Pa or less in order to prevent the fermented milk from being too hard and to realize a smoother texture upon eating.

[Laying Sideways Test]

The "laying sideways test" can be used to evaluate the resistance to laying sideways of the fermented milk in a multi-layer fermented milk product in a container. In the "laying sideways test", a fermented milk product in a container prepared through a fermentation step is stored under refrigeration at 10° C. or lower, and after 3 days, immediately after being taken out at normal temperature, the lid member sealing the opening of the container is removed from the opening, and the container is gently laid sideways on a horizontally held desk until the top edge of the container contacts the desk surface to the extent that no impact is applied. In this test, the time until the first moment when the fermented milk in the container that has been laid sideways leaks out from the opening on the top surface of the container (the time until the fermented milk layer is disintegrated due to being unable to stand by being laid sideways, hereinafter referred to as the disintegration time) is evaluated.

Such a laying sideways test is an acceleration test for evaluating the shape retention of the fermented milk when the fermented milk is laid sideways in a state where the lid member is present at a store or the like. Here, it can be said that fermented milk having a long disintegration time and high resistance to laying sideways shows high adhesiveness of fermented milk to the container. Therefore, even when the fermented milk having high resistance to laying sideways is placed in a state of laying sideways, the fermented milk layer in the container is less likely to disintegrate as compared with the conventional case, and the quality of the product at the time of production composed of two layers of the fermented milk located in the upper layer and the sugar-containing liquid (sauce) located in the lower layer of the fermented milk can be maintained as it is.

Figure 1:
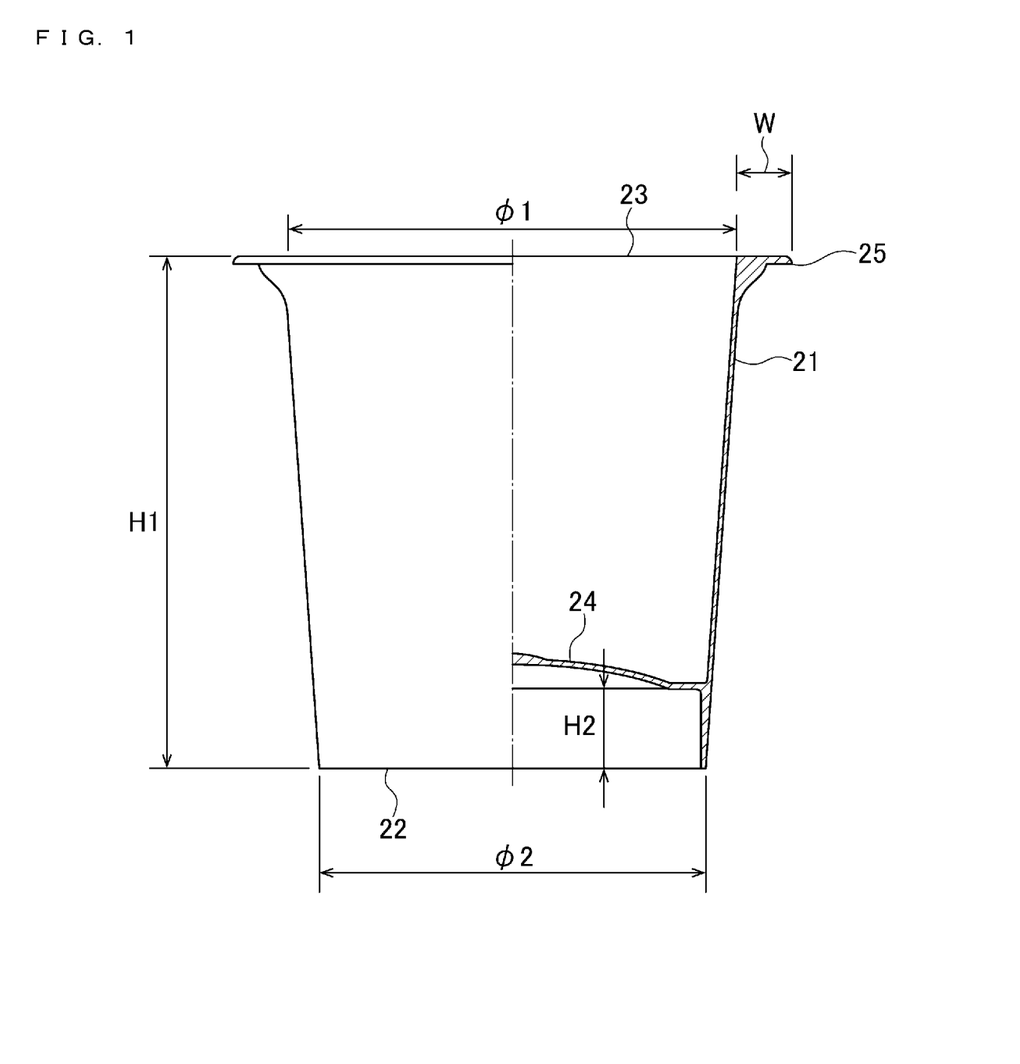
FIG. 1 is a schematic view showing a configuration of a container used in a laying sideways test.
Figure 2:
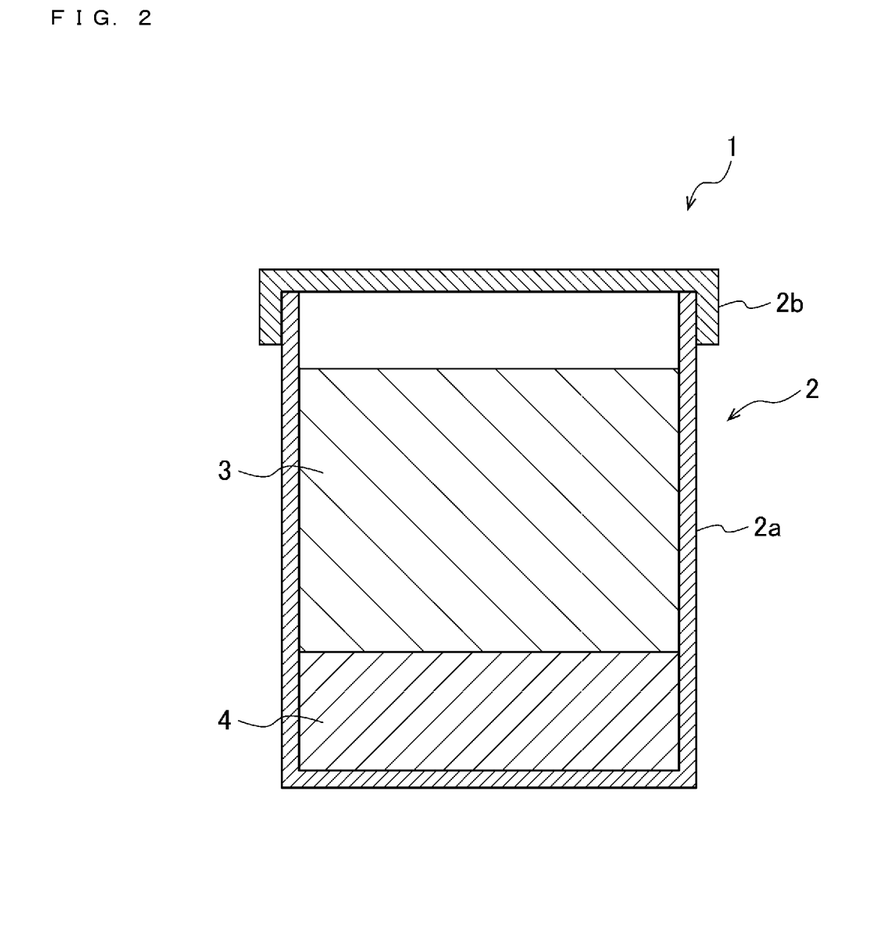
FIG. 2 is a schematic view showing a configuration of a fermented milk product in a container according to the present invention.

Here, the container used for the laying sideways test for measuring the disintegration time is made of a paper material, and as shown in FIG. 1, is formed in a bottomed cylindrical shape with a truncated cone. In this case, a container 21 is formed such that a radius $\varphi 2$ of a circular bottom portion 22 is 49 mm, a radius $\varphi 1$ of a circular opening 23 on the top surface is 58.0 mm, and a height H1 of the container 21 from the bottom portion 22 to the opening 23 is 63.9 mm. A top surface edge 25 protruding laterally outward from the opening 23 is provided around the opening 23 of the top surface. Here, a width W of the top surface edge 25 protruding laterally outward from the opening 23 is set to 6.0 mm. In the laying sideways test, when the container 21 is laid sideways on a desk, the corner portion of the bottom portion 22 and the peripheral wall of the top surface edge 25 come into contact with the desk, and the container 21 is laid sideways in an inclined state.

In addition, the container 21 has a bottom surface 24 bulging in a curved shape inside the container at a position of a height H2 (10.0 mm) from the bottom portion 22. The full capacity of the internal space from the bottom surface 24 to the opening 23 of the top surface of the container 21 is about 100 g, but in the laying sideways test, the container 21 is filled with a predetermined amount of sugar-containing liquid and raw material milk (only raw material milk in Comparative Example 4 described later) so that the total capacity of the filling materials in the container 21 is about 80 g, and the raw material milk fermented in the container is used.

In such a laying sideways test, by setting the storage modulus G' of the fermented milk to be 1200 Pa or more and 5000 Pa or less, it is possible to set the disintegration time from the start time of laying sideways to the moment when the fermented milk leaks out from the opening of the container to 2 hours to 12 hours by laying sideways the container after removing the lid member sealing the container and keeping the laying sideways state as it is, and it is possible to realize fermented milk having high resistance to laying sideways.

For example, in the case of the fermented milk of the present invention having the storage modulus G' of 1200 Pa or more, when the disintegration time from the start time of laying sideways to the moment when the fermented milk leaks out from the opening of the container was measured by laying sideways the container after removing the lid member sealing the container and keeping the laying sideways state as it is, the disintegration time was about 2 hours, and it was confirmed that the resistance to laying sideways was high.

When the disintegration time of the fermented milk of the present invention having the storage modulus G' of 2100 Pa or more was measured in the same manner, the disintegration time was about 5 hours, and it was confirmed that the resistance to laying sideways was further high.

[Sensory Evaluation]

The post-fermentation type fermented milk in a container of the present invention is evaluated to be rich (5 points) or slightly rich (4 points) by a sensory evaluation (5 grades of 1 point to 5 points) by experts. The sensory evaluation is performed based on the following methods and criteria.

Method: By a panel of three or more experts in fermented milk evaluation.

Criteria: 5 grades (5 points: rich, 4 points: slightly rich, 3 points: normal, 2 points: slightly light, 1 point: light). If necessary, a fermented milk having a solid content of 20.0 to 21.0% by mass of a post-fermentation type produced by the same production method except that the sugar-containing liquid layer is not filled or the filling amount is small may be compared and evaluated as 3 points: normal standard fermented milk. In addition, the sensory evaluation is performed by eating in a state where the fermented milk layer is not mixed with the sugar-containing liquid layer and the network structure is maintained.

Hereinafter, the present invention will be described with reference to Examples, but the present invention is not limited thereto. In these examples, the protein concentration was set to be high in the blending of the milk raw material. The reason for this is to clarify the effect of the present invention. In particular, with regard to milk protein, since the protein tends to aggregate as the pH approaches 4.6, which is the isoelectric point of casein, milk protein was blended at a high level in the examples. However, for the reason described above, the present invention is not limited to the blending of the examples.

EXAMPLES

Test Example

Production of Lactic Acid Bacteria Starter Added Yoghurt Base 115 g of powdered skim milk, 105 g of cream, 30 g of sugar, 0.5 g of sucralose, and 719.5 g of raw material water were mixed to prepare 970 g of yogurt base.

After sterilizing 970 g of the prepared yoghurt base at 95° C. for 5 minutes, *Lactobacillus delbrueckii* subsp. *bulgaricus* OLL1171 (accession number: NITE BP-01569) and *Streptococcus thermophilus* OLS3615 (accession number: NITE BP-01696) were mixed, and 1,000 g of a yoghurt base with a solid content of 17.7% by mass (hereinafter referred to as "starter added base") was prepared by adding 30 g of a lactic acid bacteria starter cultured in a 10.0% by mass powdered skim milk medium.

Measurement of Storage Modulus G'

The storage modulus G' is an index of the hardness (rich texture) of the yogurt.

The storage modulus G' (Pa) of the following post-fermented yogurts at a temperature of 18° C., a frequency of 1 Hz, and a strain of γ=1.0 was measured using a viscoelasticity measuring apparatus Physica MCR301 (Anton Paar).

Measurement of Solid Content

The solid content of the yogurt part was measured by sampling the liquid portion of the yogurt part and using a microwave moisture analyzer CEM Smart System, SMART 5 Turbo (CEM Corporation).

In Table 1 below, "solid content of sugar-containing liquid (% by mass)", "calculated solid content before fermentation (% by mass)", "measured solid content of prototype (% by mass) (after 1 day from production)", and "measured solid content of prototype (% by mass) (after 8 days from production)" indicate results measured by the above-described method for measuring solid content.

Sensory Evaluation

The following sensory evaluation (5 grades) of the post-fermented yogurt was performed by 5 expert panelists.

(5 points: rich, 4 points: slightly rich, 3 points: normal, 2 points: slightly light, 1 point: light)

Measurement of Disintegration Time

Each of the following post-fermented yogurts was subjected to a laying sideways test, and the container in which the post-fermented yogurt was prepared was caused to laying sideways, and the laying sideways state was maintained as it was, and the disintegration time (hour and minute) from the starting time of laying sideways to the moment when the yogurt leaked out from the opening of the container was measured. Note that the laying sideways test was performed under the same conditions as those described in the section of [Laying sideways test].

Measured Value of (Sugar-Containing Liquid Solid Content)–(Yogurt Part Solid Content Before Fermentation)

The liquid portion of the yogurt part before fermentation was sampled, and the solid content of the yogurt part before fermentation (yogurt part solid content before fermentation) (% by mass) was measured using a microwave moisture analyzer CEM Smart System, SMART 5 Turbo (CEM Corporation). The sugar-containing liquid was sampled before filling into the container, and the solid content of the sugar-containing liquid (sugar-containing liquid solid content) (% by mass) was measured using a microwave moisture analyzer CEM Smart System, SMART 5 Turbo (CEM Corporation). Then, the difference between the sugar-containing liquid solid content and the yogurt part solid content before fermentation, i.e., the "measured value of (sugar-containing liquid solid content)–(yogurt part solid content before fermentation)" was determined.

Example 1

80 g of the above starter added base was laminated on 20 g of a fruit sauce having a sugar content of 30.0° in a plastic cup, and fermented at 40° C. for 3 to 5 hours to prepare a post-fermented two-layer yogurt.

The storage modulus G' of the yogurt of Example 1 after 1 day from the production date was 2006 Pa, and the texture upon eating after 8 days from the production was very rich.

The storage modulus G' of the yogurt of Example 1 after 8 days from the production date was 1942 Pa. In addition, the measured value of (sugar-containing liquid solid content)–(yogurt part solid content before fermentation) was 12.3% by mass.

Example 2

80 g of the above starter added base was laminated on 20 g of a fruit sauce having a sugar content of 40.0° in a plastic cup, and fermented at 40° C. for 3 to 5 hours to prepare a post-fermented two-layer yogurt. In addition, "g" can be read as "% by mass".

The storage modulus G' of the yogurt of Example 2 after 1 day from the production date was 1046 Pa, and the texture upon eating after 8 days from the production was very rich.

The storage modulus G' of the yogurt of Example 2 after 8 days from the production date was 1557 Pa. In addition, the measured value of (sugar-containing liquid solid content)–(yogurt part solid content before fermentation) was 22.3% by mass.

Example 3

80 g of the above starter added base was laminated on 20 g of a fruit sauce having a sugar content of 50.0° in a plastic cup, and fermented at 40° C. for 3 to 5 hours to prepare a post-fermented two-layer yogurt.

The storage modulus G' of the yogurt of Example 3 after 1 day from the production date was 968 Pa, and the texture upon eating after 8 days from the production was very rich.

The storage modulus G' of the yogurt of Example 3 after 8 days from the production date was 1627 Pa. In addition, the measured value of (sugar-containing liquid solid content)–(yogurt part solid content before fermentation) was 32.3% by mass.

Example 4

80 g of the above starter added base was laminated on 20 g of a fruit sauce having a sugar content of 20.0° in a plastic cup, and fermented at 40° C. for 3 to 5 hours to prepare a post-fermented two-layer yogurt.

The storage modulus G' of the yogurt of Example 4 after 1 day from the production date was 1362 Pa, and the texture upon eating after 8 days from the production was slightly rich.

The storage modulus G' of the yogurt of Example 4 after 8 days from the production date was 1359 Pa. In addition, the measured value of (sugar-containing liquid solid content)–(yogurt part solid content before fermentation) was 2.3% by mass.

Example 5

64 g of the above starter added base was laminated on 16 g of a fruit sauce having a sugar content of 20.0° in a plastic cup, and fermented at 40° C. for 3 to 5 hours to prepare a post-fermented two-layer yogurt.

The storage modulus G' of the yogurt of Example 5 after 1 day from the production date was 1535 Pa, and the texture upon eating after 8 days from the production was very rich.

The storage modulus G' of the yogurt of Example 5 after 8 days from the production date was 2126 Pa. In addition, the measured value of (sugar-containing liquid solid content)–(yogurt part solid content before fermentation) was 17.3% by mass. With respect to the yogurt of Example 5, when the disintegration time until the layer of the yogurt was disintegrated was examined by the laying sideways test, the yogurt in the plastic cup remained in the plastic cup without disintegration for 5 hours and 20 minutes. Thus, it was confirmed that the yogurt of Example 5 had high resistance to laying sideways.

Example 6

The yogurt base (starter) used in Example 6 had a lower fat content than the yogurt bases of Examples 1 to 5 described above. Specifically, 114 g of powdered skim milk, 62 g of cream, 45 g of sugar, and 749 g of raw material water were mixed to prepare 970 g of yogurt base. Then, based on this yogurt base, a starter added base was prepared in the same manner as described above.

64 g of the above starter added base was laminated on 16 g of a fruit sauce having a sugar content of 20.0° in a plastic cup, and fermented at 40° C. for 3 to 5 hours to prepare a post-fermented two-layer yogurt.

The storage modulus G' of the yogurt of Example 6 after 1 day from the production date was 1101 Pa, and the texture upon eating after 8 days from the production was slightly rich.

The storage modulus G' of the yogurt of Example 6 after 8 days from the production date was 1524 Pa. In addition, the measured value of (sugar-containing liquid solid content)–(yogurt part solid content before fermentation) was 17.4% by mass. With respect to the yogurt of Example 6, when the disintegration time until the layer of the yogurt was disintegrated was examined by the laying sideways test, the yogurt in the plastic cup remained in the plastic cup without disintegration for 2 hours and 20 minutes. Thus, it was confirmed that the yogurt of Example 6 also had high resistance to laying sideways.

Comparative Example 1

100 g of the above starter added base in the plastic cup was fermented at 40° C. for 3 to 5 hours to prepare a post-fermented yoghurt. In Comparative Example 1, the plastic cup was not filled with fruit sauce.

The storage modulus G' of the yogurt of Comparative Example 1 after 1 day from the production date was 931 Pa, and the texture upon eating after 8 days from the production was less rich texture than those of Examples 1, 2, 3 and 5.

The storage modulus G' of the yogurt of Comparative Example 1 after 8 days from the production date was 1049 Pa, which was less than 1200 Pa.

Comparative Example 2

90 g of the above starter added base was laminated on 10 g of a fruit sauce having a sugar content of 30.0° in a plastic cup, and fermented at 40° C. for 3 to 5 hours to prepare a post-fermented two-layer yogurt. In Comparative Example 2, the plastic cup was filled with the fruit sauce, but the filling amount of the fruit sauce was reduced.

The storage modulus G' of the yogurt of Comparative Example 2 after 1 day from the production date was 676 Pa, and the texture upon eating after 8 days from the production was such that the rich texture was insufficient as compared with Examples 1, 2, 3, and 5.

The storage modulus G' of the yogurt of Comparative Example 2 after 8 days from the production date was 913 Pa, which was less than 1200 Pa. In addition, the measured value of (sugar-containing liquid solid content)–(yogurt part solid content before fermentation) was 12.3% by mass.

Comparative Example 3

80 g of the above starter added base was laminated on 20 g of a fruit sauce having a sugar content of 60.0° in a plastic cup, and fermented at 40° C. for 3 to 5 hours to prepare a post-fermented two-layer yogurt. In this Comparative Example 3, the solid content in the fruit sauce, that is, the sugar-containing liquid solid content was increased.

The storage modulus G' of the yogurt of Comparative Example 3 after 1 day from the production date was 854 Pa, and the texture upon eating after 8 days from the production was such that the rich texture was insufficient as compared with Examples 1, 2, 3, and 5.

The storage modulus G' of the yogurt of Comparative Example 3 after 8 days from the production date was 854 Pa, which was less than 1200 Pa. In addition, the measured value of (sugar-containing liquid solid content)–(yogurt part solid content before fermentation) was 42.3% by mass.

Comparative Example 4

104 g of powdered skim milk, 105 g of cream, 60 g of sugar, 0.2 g of sucralose, and 700.8 g of raw material water were mixed to prepare 970 g of yoghurt base, 100 g of 1,000 g of the starter added base was put into a plastic cup in the same manner as in Example 1, and fermented at 40° C. for 3 to 5 hours to prepare a post-fermented yoghurt. In Comparative Example 4, the solid content of the yogurt part was slightly increased, and the plastic cup was not filled with fruit sauce.

The storage modulus G' of the yogurt of Comparative Example 4 after 1 day from the production date was 1182 Pa, and the texture upon eating after 8 days from the production was such that the rich texture was insufficient as compared with Examples 1, 2, 3, and 5.

The storage modulus G' of the yogurt of Comparative Example 4 after 8 days from the production date was 1190 Pa, which was less than 1200 Pa.

TABLE 1

| | Example 1 | Example 2 | Example 3 | Example 4 | Comparative Example 1 | Comparative Example 2 | Comparative Example 3 | Comparative Example 4 | Example 5 | Example 6 |
|---|---|---|---|---|---|---|---|---|---|---|
| Sauce added | | | | | | | | | | |
| Added amount (% by mass) | 20 | 20 | 20 | 20 | Absence | 10 | 20 | Absence | 20 | 20 |
| Sugar-containing liquid solid content (% by mass) | 30 | 40 | 50 | 20 | — | 30 | 60 | — | 35 | 35 |
| Yogurt part | | | | | | | | | | |
| Calculated solid content before fermentation (% by mass) | 17.7 | 17.7 | 17.7 | 17.7 | 17.7 | 17.7 | 17.7 | 20.0 | 17.7 | 17.6 |
| Measured solid content of | 20.3 | 21.1 | 21.2 | 20.8 | 18.8 | 20.7 | 22.7 | 20.5 | 21.3 | 21.0 |

TABLE 1-continued

| | Example 1 | Example 2 | Example 3 | Example 4 | Comparative Example 1 | Comparative Example 2 | Comparative Example 3 | Comparative Example 4 | Example 5 | Example 6 |
|---|---|---|---|---|---|---|---|---|---|---|
| prototype (% by mass) (after 1 day from production) | | | | | | | | | | |
| Measured solid content of prototype (% by mass) (after 8 days from production) | 22.4 | 23.8 | 24.9 | 21.4 | 19.0 | 21.4 | 24.7 | 20.7 | 24.5 | 24.2 |
| Storage modulus G' (Pa) (after 1 day from production) | 2006 | 1046 | 968 | 1362 | 931 | 676 | 823 | 1182 | 1535 | 1101 |
| Storage modulus G' (Pa) (after 8 days from production) | 1942 | 1557 | 1627 | 1359 | 1049 | 913 | 854 | 1190 | 2126 | 1524 |
| Yogurt flavor evaluation (5 grades) (8 days after production) | 5 | 5 | 5 | 4 | 2 | 2 | 2 | 3 | 5 | 4 |
| Disintegration time (hour, min) | — | — | — | — | — | — | — | 1 h. 50 min. | 5 h. 20 min. | 2 h. 20 min. |
| Measured value of (sugar-containing liquid solid content) − (yogurt part solid content before fermentation) (% by mass) | 12.3 | 22.3 | 32.3 | 2.3 | — | 12.3 | 42.3 | — | 17.3 | 17.4 |

The present inventors have found that, by fermenting fermented milk in contact with a sugar-containing liquid source or the like, the solid content of the fermented milk can be increased while maintaining the network structure of the yogurt formed in the post-fermentation type, and as a result, the storage modulus G' is increased, the resistance to laying sideways is high, and the rich texture can be improved.

2. Second Embodiment (1) Fermented Milk Product of the Present Invention

FIG. 1 shows a fermented milk product 1 in a container according to the present invention. The fermented milk product 1 is of a post-fermentation type, has a fermented milk layer 3 and a sauce layer 4, and is accommodated in a container 2 composed of a container body 2a and a lid 2b. The container body 2a accommodates the fermented milk layer 3 as an upper layer and the source layer 4 as a lower layer. The sauce for the fermented milk product forming the sauce layer 4 is not rolled up into the fermented milk layer 3, and a clear interface exists between the fermented milk layer 3 and the sauce layer 4.

(2) Source for Fermented Milk Product of the Present Invention

Next, the source for the fermented milk product forming the source layer 4 in the fermented milk product 1 will be described. Sauces for fermented milk products are composed of modified starches, pectins, sweeteners, and other materials. The present embodiment is characterized in that the sauce contains a predetermined amount of modified starch and pectin. By adding a predetermined amount of modified starch and pectin to the sauce, the state at the time of production in which the sauce is disposed on the lower side of the fermented milk layer 3 in the fermented milk product 1 as the final product can be maintained as compared with the conventional case.

Examples of the modified starch include hydroxypropylated phosphoric acid crosslinked starch, acetylated adipic acid crosslinked starch, acetylated phosphoric acid crosslinked starch, acetylated oxidized starch, acetylated starch (starch acetate), sodium starch octenylsuccinate, oxidized starch, hydroxypropyl starch, phosphoric acid monoesterified phosphoric acid crosslinked starch, phosphorylated starch, phosphoric acid crosslinked starch, and sodium starch glycollate.

In particular, from the viewpoint of maintaining the layer state of the fermented milk layer 3 and the source layer in the fermentation step, it is desirable to apply hydroxypropylated phosphoric acid crosslinked starch. From the viewpoint of maintaining the layer state of the fermented milk layer 3 and the sauce layer 4 in the fermentation step, the modified starch is preferably contained in the sauce in an amount of 0.25% by weight or more, more preferably 0.30% by weight or more, and particularly preferably 0.35% by weight or more.

In the first embodiment described above, the content of the composition is represented by % by mass, and in the second embodiment, the content is represented by % by weight. However, the % by weight expressed in the second embodiment can be read as % by mass. The "source" in the second embodiment refers to the "sugar-containing liquid" in the first embodiment described above, and can also be read as the "sugar-containing liquid".

Examples of the pectin include LM pectin and HM pectin. LM pectin is preferably applied from the viewpoint of maintaining the layer state of the fermented milk layer 3 and the sauce layer 4 particularly in product transportation. From the viewpoint of maintaining the layer state of the fermented milk layer 3 and the sauce layer 4 in product transportation, the pectin is preferably contained in the sauce in an amount of 0.15% by weight or more, more preferably 0.20% by weight or more, and particularly preferably 0.25% by weight or more.

The content of the modified starch is a measured value measured by a colorimetric assay (hydrogen peroxide) using a starch quantification kit (the starch contained is enzymatically decomposed into glucose, the glucose is enzymatically oxidized, and the generated hydrogen peroxide is measured according to a website of Cosmo Bio Co., Ltd. (see https://www.cosmobio.co.jp/product/detail/starch-assay-kit-colorimetric-cbl.asp?entry_id=16763) which is a colorimetric assay). The content of the pectin is a measured value measured by Prosky's method and the high performance liquid chromatography method (see Food Analysis Technology Center SUNATEC: http://www.mac.or.jp/mail/161101/03.shtml).

Examples of the sweetener include saccharides such as sugar, fructose, glucose, and isomerized sugar; sugar alcohols such as trehalose; artificial sweeteners such as aspartame and stevia; honey; and maple syrup.

Examples of the other materials include fruit juice, fruit pulp, nuts, cocoa powder, chocolate, cocoa extract, pH modifiers, flavoring agents, and pigments. Examples of the fruit juice include lemon, peach, melon, kiwi, grape, orange, banana, blueberry, strawberry, and mixtures thereof. Examples of the fruit pulp include peach, melon, kiwi, grape, orange, banana, blueberry, strawberry, and the like, as well as aloe and nata de coco which can be handled in the same way as the fruit pulp.

In the present invention, preferable examples of the sauce for a fermented milk product include a fruit sauce containing fruit pulp, which is composed of a sauce base containing modified starch, pectin, saccharide (sweetener) and fruit juice, and fruit pulp. Other preferable examples of the sauce for a fermented milk product include chocolate sauce composed of a sauce base containing modified starch, pectin, saccharide (sweetener), cocoa powder, chocolate and cocoa extract, and fruit pulp.

In this case, the content of the saccharide in the sauce is preferably 40 to 60% by weight, more preferably 42 to 58% by weight, and particularly preferably 45 to 55% by weight from the viewpoint of flavor.

The sugar content of the sauce is preferably 40° or more, more preferably 42° or more, and particularly preferably 45° or more, from the viewpoint of maintaining the layer state of the fermented milk layer 3 and the sauce layer 4. In addition, the sugar content of the sauce is preferably 60° or less, more preferably 58° or less, and particularly preferably 55° or less, from the viewpoint of preventing color turbidity of the fermented milk layer.

The sugar content of the sauce is a measurement value measured by a digital sugar content meter (IPR-201α manufactured by As One Corporation).

The viscosity (at 10° C.) of the sauce is preferably 9000 cP or more, more preferably 10000 cP, and particularly preferably 11000 cP or more, from the viewpoint of maintaining the layer state of the fermented milk layer 3 and the sauce layer 4.

The viscosity of the sauce is a measurement value measured using a rotational Brookfield viscometer (for example, "TVB10-type viscometer" manufactured by Toki Sangyo Co., Ltd.) at a measurement temperature of 10° C. after a No. 4 rotor (code M23) is inserted into a measurement object and rotated (60 rpm, for 30 seconds).

(3) Fermented Milk in Fermented Milk Product of the Present Invention

The fermented milk forming the fermented milk layer 3 is obtained by fermenting a fermented milk mix (raw material of fermented milk including raw material milk). The fermented milk mix is a mixture containing raw material milk and other components, and can be obtained by, for example, heating, dissolving and mixing a fermented milk raw material composed of raw material milk, water, and other optional components (for example, sugars, saccharides, flavoring agents, and the like).

Examples of raw material milk which is one of raw materials of the fermented milk mix include animal milk such as cow milk, processed products thereof (for example, skim milk, powdered skim milk, skimmed condensed milk, filtration concentrate or permeate of milk, brick milk, whey, milk protein concentrate (MPC), whey protein concentrate (WPC), butter milk, raw cream, and the like), vegetable milk such as soybean milk derived from soybeans, and the like.

The contents of milk protein, milk fat, and the like in the fermented milk or the fermented milk mix are not particularly limited, and known contents thereof in the fermented milk or the fermented milk mix can be applied.

(4) Method for Producing Fermented Milk Product of the Present Invention

Next, an example of a method for producing the fermented milk product 1 in a container of the present invention will be described below. Here, a method for producing a sauce for a fermented milk product, a method for producing a fermented milk mix, and a method for producing the fermented milk product 1 will be described in this order.

(4-1) Method for Producing Sauce for Fermented Milk Product

First, a method for producing a sauce for forming the sauce layer 4 of the fermented milk product 1 will be described below. In this case, 0.25% by weight or more of modified starch and 0.15% by weight or more of pectin are blended, and a sweetener and other materials are blended to prepare a sauce raw material. At this time, the viscosity of the sauce at 10° C. can be adjusted by adjusting the contents of the modified starch, pectin, and stabilizer. Further, the sugar content of the sauce can be adjusted by adjusting the content of the sweetener, fruit juice, or the like.

Next, the source raw material thus prepared is heated while being stirred. When the temperature of the source raw material being stirred reaches 95° C. or higher, heating and stirring are terminated and cooling is performed. Thus, a sauce for a fermented milk product can be produced (sauce production step).

(4-2) Method for Producing Fermented Milk Mix

Next, a method for producing a fermented milk mix which becomes the fermented milk layer 3 of the fermented milk product 1 by fermentation will be described below. In this case, for example, a fermented milk base is prepared by adding and mixing predetermined amounts of raw milk, powdered skim milk, skimmed condensed milk, raw cream, butter, milk protein concentrate, raw material water, and the like. In addition, sugar, fruit juice or the like may be added to the fermented milk base.

Next, the prepared fermented milk base is sterilized by heating at about 90° C. to 120° C. for 30 seconds or more, and then a lactic acid bacteria starter is added. Thus, a fermented milk mix can be produced (fermented milk mix production step). Examples of the lactic acid bacteria starter include lactic acid bacteria such as *Lactobacillus bulgaricus* and *Streptococcus thermophilus*.

(4-3) Production of Fermented Milk Product

Next, the sauce produced as described above is accommodated in the container body 2a (sauce accommodating step). Thus, the source layer 4 in which the source is layered is formed in the container body 2a. Next, the fermented milk mix is accommodated in the container body 2a in which the source layer 4 is formed (fermented milk mix accommodating step). Thus, a fermented milk mix layer made by the fermented milk mix is formed on the source layer 4. In the present embodiment, although the case where the fermented milk mix accommodating step is performed after the sauce accommodating step has been described, but the present invention is not limited thereto, and first, the fermented milk mix may be accommodated in the container body 2a (fermented milk mix accommodating step), and then the sauce may be accommodated in the container body 2a (sauce accommodating step).

Then, the fermented milk mix accommodated in the container body 2a is fermented at about 40° C. for 3 to 5 hours, for example (fermentation step). In this way, it is possible to produce the fermented milk product 1 in a container in which the fermented milk layer 3 made of fermented milk is formed on the source layer 4. The conditions such as the fermentation temperature and the fermentation time may be ordinary conditions in the production of fermented milk.

(5) Function and Effect

In the above constitution, the sauce for the fermented milk product contains 0.25% by weight or more of modified starch and 0.15% by weight or more of pectin. As described above, in the sauce for the fermented milk product, both of the modified starch and the pectin are contained, and further, the contents thereof are adjusted, whereby in the fermented milk product 1, the layer state of the fermented milk layer 3 and the sauce layer 4 can be maintained as compared with the conventional case.

For example, even when a sauce having a darker color than white fermented milk, such as chocolate sauce for fermented milk products containing various raw materials such as chocolate, is used, the layer state of the fermented milk layer 3 and the source layer 4 can be maintained, so that only the surfaces of the white fermented milk layer 3 can be visually recognized by consumers when the product is opened, and an impression that a good quality state is maintained can be given.

EXAMPLES

Hereinafter, the second embodiment of the present invention will be specifically described with reference to Examples, but the present invention is not limited to these examples. Here, as the sauce for fermented milk products, raw materials shown in Table 2 below were blended to produce chocolate sauce for fermented milk products (hereinafter simply referred to as sauce) as shown in Examples 1 to 3 and Comparative Examples 1 to 3. Examples 1 to 3 and Comparative Examples 1 to 3 shown in Table 2 below are different from Examples 1 to 6 and Comparative Examples 1 to 4 shown in Table 1 of the first embodiment described above, and here, for convenience of description, description will be made as Examples 1 to 3 and Comparative Examples 1 to 3.

TABLE 2

|  | Example 1 | Example 2 | Example 3 | Comparative Example 1 | Comparative Example 2 | Comparative Example 3 |
|---|---|---|---|---|---|---|
| Chocolate raw material [g] | 13.500 | 13.500 | 13.500 | 13.500 | 13.500 | 13.500 |
| Orange fruit pulp [g] | 8.000 | 8.000 | 8.000 | 8.000 | 8.000 | 8.000 |
| Sugar [g] | 32.000 | 32.000 | 32.000 | 32.000 | 32.000 | 32.000 |
| Emulsifier [g] | 1.000 | 1.000 | 1.000 | 1.000 | 1.000 | 1.000 |
| Stabilizer [g] | 0.255 | 0.255 | 0.255 | 0.255 | 0.255 | 0.255 |
| pH adjuster [g] | 0.600 | 0.600 | 0.600 | 0.600 | 0.600 | 0.600 |
| Flavoring agent [g] | 0.300 | 0.300 | 0.300 | 0.300 | 0.300 | 0.300 |
| LM pectin [% by weight] | 0.200 | 0.200 | 0.150 | 0.200 | 0.100 | — |
| Hydroxypropylated phosphoric acid crosslinked starch [% by weight] | 0.500 | 0.250 | 0.500 | — | 0.500 | 0.500 |
| Raw starch (corn starch) [% by weight] | — | — | — | 0.500 | — | — |
| Water [g] | 43.645 | 43.895 | 43.695 | 43.645 | 43.745 | 43.845 |
| Viscosity (cP: 10° C.) | 11220 | 13300 | 13120 | 8220 | 10860 | 9670 |
| Brix (°) | 45 | 45 | 45 | 45 | 45 | 45 |

Example 1

In Example 1, as shown in Table 2 above, in addition to 13.5 g of chocolate raw material, 8.0 g of orange fruit pulp, 32 g of sugar, 1.0 g of emulsifier, 0.255 g of stabilizer, 0.6 g of pH adjuster, 0.3 g of flavoring agent, and 43.645 g of raw material water, 0.2% by weight of LM pectin (manufactured by Unitec Foods Co., Ltd.) and 0.5% by weight of corn-derived hydroxypropylated phosphoric acid crosslinked starch (Purity660, manufactured by Ingredion Incorporated) were further added and mixed to prepare a sauce raw material.

The content of hydroxypropylated phosphoric acid crosslinked starch in Example 1, Examples 2 and 3 and Comparative Examples 1 to 3 described later is a measurement value measured by a colorimetric assay (hydrogen peroxide) using a starch quantification kit (manufactured by Cosmo Bio Co., Ltd.). In addition, the content of LM pectin is a measurement value measured by Prosky's method and the high performance liquid chromatography method.

Then, heating of the sauce raw material was started while stirring, and the sauce raw material was cooled when the temperature reached 95° C. to produce a sauce of Example 1.

Example 2

In Example 2, the raw materials to be blended were the same as those in Example 1, but the content of hydroxypropylated phosphoric acid crosslinked starch was changed to 0.25% by weight. The amount of raw material water was 43.895 g. Then, heating of the obtained sauce raw material was started while stirring, and the sauce raw material was cooled when the temperature reached 95° C. to produce a sauce of Example 2.

Example 3

In Example 3, the raw materials to be blended were the same as those in Example 1, but the content of LM pectin was changed to 0.15% by weight. The amount of raw material water was 43.695 g. Then, heating of the obtained sauce raw material was started while stirring, and the sauce raw material was cooled when the temperature reached 95° C. to produce a sauce of Example 3.

Comparative Example 1

In Comparative Example 1, different from Example 1, 0.5% by weight of raw starch (corn starch) was contained instead of hydroxypropylated phosphoric acid crosslinked starch, and other raw materials were the same as those in Example 1. The amount of raw material water was 43.645 g. Then, heating of the obtained sauce raw material was started while stirring, and the sauce raw material was cooled when the temperature reached 95° to produce a sauce of Comparative Example 1.

Comparative Example 2

In Comparative Example 2, different from Example 1, the content of LM pectin was set to 0.1% by weight, which was less than 0.15% by weight, and other raw materials were the same as those in Example 1. The amount of raw material water was 43.745 g. Then, heating of the obtained sauce raw material was started while stirring, and the sauce raw material was cooled when the temperature reached 95° C. to produce a sauce of Comparative Example 2.

Comparative Example 3

In Comparative Example 3, different from Example 1, LM pectin was not contained, and other raw materials were the same as those in Example 1. The amount of raw material water was 43.845 g. Then, heating of the obtained sauce raw material was started while stirring, and the sauce raw material was cooled when the temperature reached 95° C. to produce a sauce of Comparative Example 3.

<Viscosity and Sugar Content of Sauce>

Next, each sauce of Examples 1 to 3 and Comparative Examples 1 to 3 described above was stored in a refrigerator at 10° C. or lower, and the next day, the viscosity and sugar content of each sauce at 10° C. were measured. As a result, the results shown in "viscosity (cP: 10° C.)" and "Brix (°)" in Table 2 above were obtained.

Here, the viscosity of each sauce is a measurement value measured using a rotational Brookfield viscometer (for example, "TVB10-type viscometer" manufactured by Toki Sangyo Co., Ltd.) at a measurement temperature of 10° C. after a No. 4 rotor (code M23) is inserted into the sauce to be a measurement object and rotated (60 rpm, for 30 seconds).

The viscosities of Examples 1 to 3 were 9000 cP or more, more specifically 10000 cP or more and 11000 cP or more, but the viscosity of the sauce of Comparative Example 1 was less than 9000 cP. The viscosity of the sauce of Comparative Example 3 was less than 10000 cP, and the viscosity of the sauce of Comparative Example 2 was less than 11000 cP.

The sugar content of each source is a value measured by a digital sugar content meter (IPR-201α manufactured by As One Corporation).

Although the sauce of each of Examples 1 to 3 and the sauce of each of Comparative Examples 1 to 3 had different viscosities as described above, the sugar content was 40° or more, which was an optimum sugar content.

<Production of Fermented Milk Mix>

Next, in order to produce a post-fermentation type fermented milk product having the fermented milk layer 3 and the source layer 4, first, a fermented milk mix to be the fermented milk layer 3 was prepared. Here, 115 g of powdered skim milk, 105 g of cream, 30 g of sugar, 0.5 g of sucralose, and 719.5 g of raw material water were mixed to prepare 970 g of fermented milk base. The fermented milk base was then sterilized at 95° C. for 5 minutes.

*Lactobacillus delbrueckii* subsp. *bulgaricus* OLL1171 (accession number: NITE BP-01569) and *Streptococcus thermophilus* OLS3615 (accession number: NITE BP-01696) were mixed, and a lactic acid bacteria starter cultured in a 10.0% powdered skim milk medium was produced. Then, 30 g of the lactic acid bacteria starter was added to 970 g of the fermented milk base to prepare 1000 g of a fermented milk mix having a solid content of 17.7%.

<Production of Fermented Milk Product in Container and Evaluation Thereof>

Next, 16 g of each source of Examples 1 to 3 and Comparative Examples 1 to 3 described above was filled in the container body 2a to form the source layer 4. Thereafter, 64 g of the above fermented milk mix was filled on each source layer for each container body 2a to form a fermented milk mix layer on the source layer 4. Then, the fermented milk mix was fermented at about 40° C. for 3 to 5 hours to produce the fermented milk product 1 in a container having the fermented milk layer 3 on the source layer 4 in the container body 2a.

Next, with respect to the fermented milk products using the sauces of Examples 1 to 3 and Comparative Examples 1 to 3, it was confirmed whether or not the surface of the fermented milk layer 3 was in the same state as at the time of production when the inside of the container was viewed from above at the end of fermentation.

As a result, in the sauce of Example 1 containing 0.50% by weight or more of modified starch and 0.20% by weight or more of pectin, the sauce of Example 2 containing 0.25% by weight or more of modified starch and 0.20% by weight or more of pectin, and the sauce of Example 3 containing 0.50% by weight or more of modified starch and 0.15% by weight or more of pectin, the surface of the fermented milk layer 3 was in the same state as at the time of production when the inside of the container was viewed from above at the end of fermentation. This indicates that the layer state of the fermented milk layer 3 and the source layer 4 is maintained. On the other hand, in the sauces of Comparative Examples 1 to 3 which did not contain the modified starch and the pectin in predetermined contents, the layer state of the fermented milk layer 3 and the sauce layer 4 was not maintained at the end of fermentation, and the sauce was seen on the surface of the fermented milk layer 3.

Next, the fermented milk product 1 in each container was stored for 1 day while being kept refrigerated at 10° C. or lower after the production, and thereafter, the product was loaded on a truck and transported for 1 day while being kept refrigerated, whereby a situation until the fermented milk product 1 in the container as a final product was transported to a store was reproduced in a pseudo manner. Then, such a vibration evaluation test was performed to confirm whether or not the surface of the fermented milk layer 3 was in the same state as at the time of production when the inside of the container was viewed from above at the end of product transportation.

For Comparative Examples 1 to 3, only those samples in which the surface of the fermented milk layer 3 was in the same state as at the time of production at the end of fermentation were selected, stored for 1 day while being kept refrigerated at 10° C. or lower, and then loaded on a truck and transported for 1 day while being kept refrigerated (vibration evaluation test).

As a result, with respect to the sauce of Example 1 containing 0.50% by weight or more of modified starch and 0.20% by weight or more of pectin, the sauce of Example 2 containing 0.25% by weight or more of modified starch and 0.20% by weight or more of pectin, and the sauce of Example 3 containing 0.50% by weight or more of modified starch and 0.15% by weight or more of pectin, the surface of the fermented milk layer 3 of all the fermented milk products 1 when the inside of the container was viewed from above was in the same state as at the time of production even after vibration was applied, and the layer state of the fermented milk layer 3 and the sauce layer 4 was maintained.

Further, even in the sauces of Comparative Examples 2 and 3 containing 0.25% by weight or more of modified starch, the surface of the fermented milk layer 3 of all the fermented milk products 1 remained in the same state as at the time of production after vibration was applied. On the other hand, in the sauce of Comparative Example 1 containing raw starch instead of modified starch, the sauce appeared on the surface of the fermented milk layer 3 after vibration was applied.

From the above, it was confirmed that the layer state of the fermented milk layer 3 and the source layer 4 can be maintained for all the fermented milk products 1 both at the time of end of fermentation and at the time of end of product transportation by using a source for a fermented milk product containing 0.25% by weight or more of modified starch (hydroxypropylated phosphoric acid crosslinked starch) and 0.15% by weight or more of pectin (LM pectin).

3. Other Embodiments

The above-described multi-layer fermented milk product in a container of the first embodiment and the sauce (sugar-containing liquid) of the second embodiment may be appropriately combined. For example, the sauce (sugar-containing liquid) of the second embodiment may be applied to the multi-layer fermented milk product in a container of the first embodiment. In this case, the sugar-containing liquid in the first embodiment contains the modified starch and pectin described in the second embodiment.

Specifically, as the sugar-containing liquid (source) in the first embodiment, a sugar-containing liquid having a solid content of 20.0% by mass or more, containing 0.25% by weight or more of modified starch, and containing 0.15% by weight or more of pectin can be used. Thus, in addition to the effects of the first embodiment, the layer state of the fermented milk layer and the sugar-containing liquid layer can be further maintained in the multi-layer fermented milk product in a container according to the first embodiment as compared with the conventional case.

At this time, in the sugar-containing liquid in the first embodiment, as described in the second embodiment, the modified starch is preferably hydroxypropylated phosphoric acid crosslinked starch, and the pectin is preferably LM pectin.

REFERENCE SIGNS LIST

1 Fermented milk product
2, 21 Container
3 Fermented milk layer
4 Source layer

The invention claimed is:

1. A multi-layer fermented milk product in a container, comprising: a fermented milk layer of a post-fermentation type; and a sugar-containing liquid layer adjacent to and below the fermented milk layer in the container, wherein a storage modulus G' of the fermented milk, which is an index of hardness of the fermented milk, is 1200 Pa or more and 2500 Pa or less, and the fermented milk layer has a solid content of 20.0% by mass or more, and wherein the sugar-containing liquid comprises 0.25% by weight or more of modified starch and 0.15% by weight or more of pectin.

2. The multi-layer fermented milk product in the container according to claim 1, wherein the fermented milk layer has a solid content of 21.4% by mass or more.

3. The multi-layer fermented milk product in the container according to claim 1, wherein a disintegration time until the fermented milk layer is disintegrated by a laying sideways test is 2 hours or more.

4. A method for producing a multi-layer fermented milk product in a container, comprising the steps of:
    filling the container with a raw material milk to which a starter has been added and a sugar-containing liquid so as not to mix the raw material milk and the sugar-containing liquid, wherein the sugar-containing liquid is present in an amount of 15.0% by mass or more of the total amount of the raw material milk and the sugar-containing liquid, the sugar-containing liquid has a solid content of 20.0% by mass or more; and the raw material milk has a solid content of 17.6% by mass or more; and
    fermenting the raw material milk in the filled container to obtain the multi-layer fermented milk product in the container in which a fermented milk layer having a higher solid content than the raw material milk is formed, a storage modulus G' of the fermented milk, which is an index of hardness of the fermented milk, is 1200 Pa or more and 2500 Pa or less, and the fermented milk layer has a solid content of 20.0% by mass or more, and wherein the sugar-containing liquid comprises 0.25% by weight or more of modified starch and 0.15% by weight or more of pectin.

5. The multi-layer fermented milk product in the container according to claim 1, wherein the content of the modified starch of the sugar-containing liquid is 0.25% by weight or more and 0.50% by weight or less.

6. The production method according to claim 4, wherein the solid content of the sugar-containing liquid to be filled is higher than a solid content of the raw material milk by 2.0 to 40.0% by mass.

7. The production method according to claim 4, wherein the amount of the sugar-containing liquid to be filled is 20.0 to 40.0% by mass of the total amount of the raw material milk and the sugar-containing liquid.

8. The production method according to claim 4, wherein the solid content of the raw material milk is less than 20.0% by mass.

9. The production method according to claim 4, wherein the solid content of the fermented milk layer is 1.10 times or more that of the raw material milk.

10. The production method according to claim 4, wherein the solid content of the fermented milk layer is 21.4% by mass or more.

11. The production method according to claim 4, wherein the content of the modified starch of the sugar-containing liquid is 0.25% by weight or more and 0.50% by weight or less.

* * * * *